J. M. DOLAN & R. P. AYLWARD.
PORTABLE HAY PRESS.
APPLICATION FILED FEB. 20, 1908.

962,555.

Patented June 28, 1910.
6 SHEETS—SHEET 6.

WITNESSES:
INVENTORS
J. M. Dolan
R. P. Aylward
BY
ATTORNEY.

UNITED STATES PATENT OFFICE.

JAMES M. DOLAN AND RICHARD P. AYLWARD, OF LIVERMORE, CALIFORNIA.

PORTABLE HAY-PRESS.

962,555.

Specification of Letters Patent. Patented June 28, 1910.

Application filed February 20, 1908. Serial No. 416,835.

*To all whom it may concern:*

Be it known that we, JAMES M. DOLAN and RICHARD P. AYLWARD, citizens of the United States, residing at Livermore, in the county of Alameda and State of California, have invented new and useful Improvements in Portable Hay-Presses, of which the following is a specification.

The present invention relates to improvements in hay presses, the object of the invention being to provide a portable hay press, which can be transported from stack to stack, and the hay of the stack pressed thereby, with greater economy, rapidity, convenience, and safety, than with those heretofore used; also to form a bale without any loose fringes or ragged edges but compact and with all sides clean and trim and which will therefore pack better and result in less waste of materal.

With upright portable hay presses at present in use, it is the practice, when moving the press on the road or from stack to stack in the field, to fasten to the top of the press a rope or chain, to which a team of horses is hitched, and then the press is thereby pulled down, and across, a wagon, the bed of which is especially constructed for holding such a press. The unloading of said press, again, from the wagon, in order to erect it in position, requires five or six able-bodied men, practiced in the work, owing to the fact that this operation must be done entirely by hand and without the use of a team of horses, because the press when in use must stand in an upright position nine or ten feet from the stack, which does not allow sufficient room between the stack and press to use a team of horses. This unloading and setting up consumes much time and labor, which are now avoided by our present invention. Furthermore, with the upright presses at present in use, a great deal of time and labor is consumed in the loading and unloading of scales, forks, shovels, picks, tables, crow-bars, sledges, stakes, wire ropes, and numerous other tools, all of which we avoid with our present invention. Furthermore, with the old style of presses, much labor is required to handle the derrick used therewith. Said derrick is formed of poles 22 feet high and 4 inches square, and is quite heavy to lower to the ground, or to raise again at a new stack, except with a well trained and steady team of horses. It requires seven or eight men to raise it in position for work, and this operation is not only laborious, but extremely dangerous. To our knowledge, in the last ten years, six men have been killed, and as many injured, in this vicinity, in the raising and lowering of derricks for hay presses.

A further object of the invention therefore is to avoid this dangerous and laborious operation.

In the accompanying drawings, Fig. 4 is a front view of the same.

Figure 3:
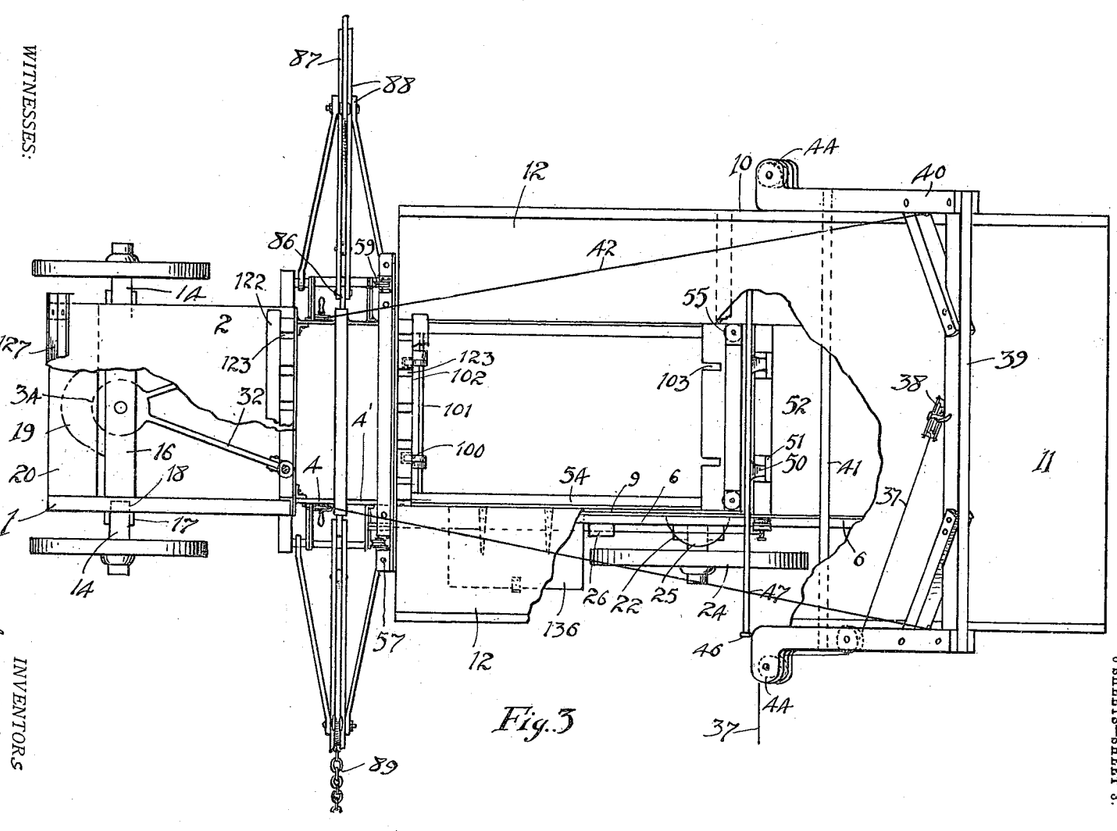
Fig. 3 is a broken plan view of the same.
Figure 4:
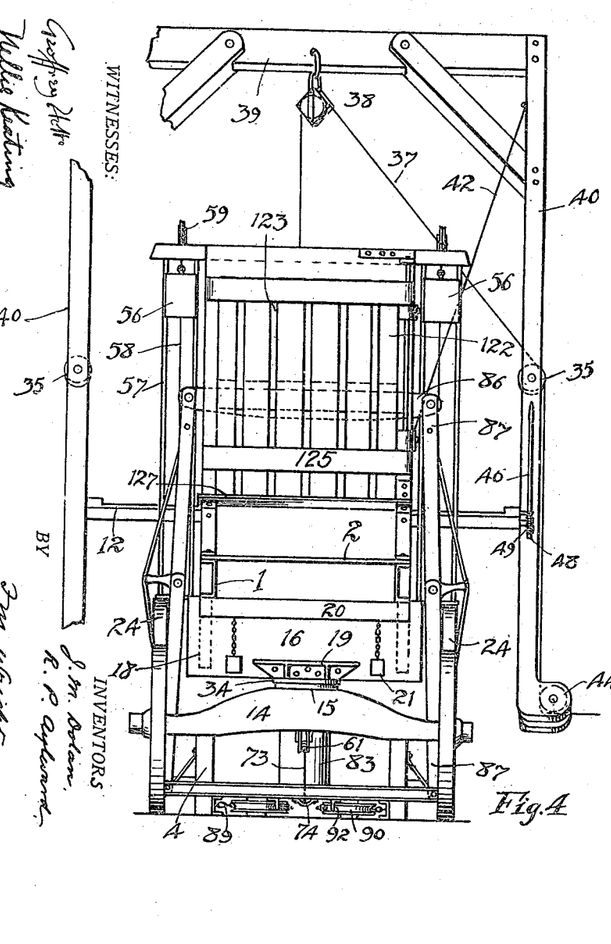
Figure 5:
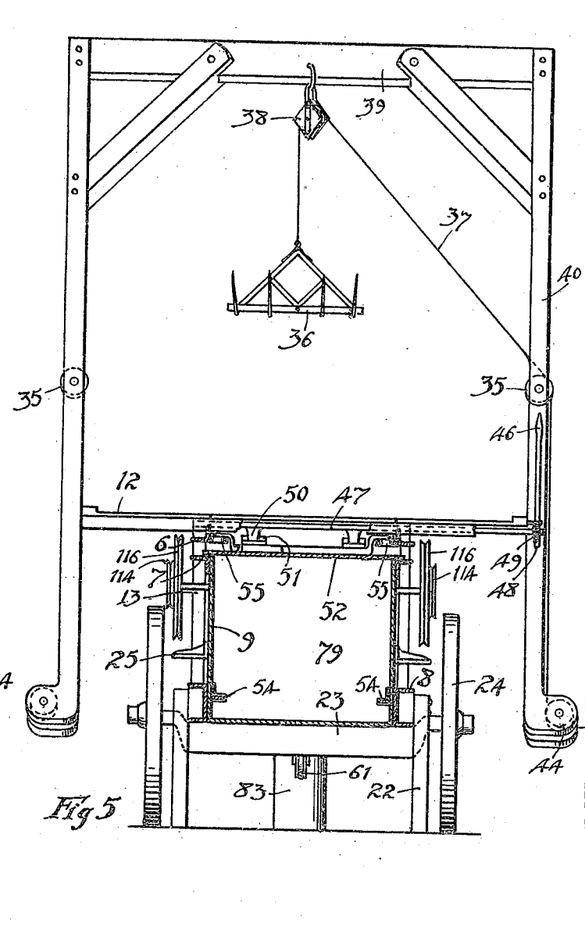
Fig. 5 is a vertical cross section through the receiver.
Figure 6:
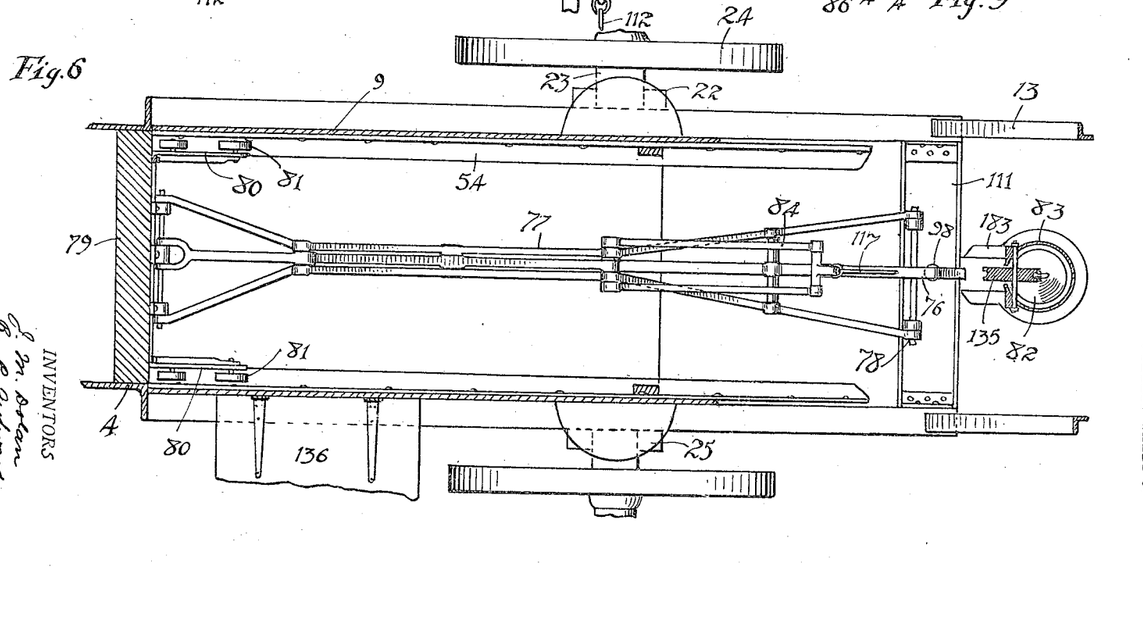
Fig. 6 is an enlarged horizontal section through the receiver.

*Frame of machine and receiver.*—Upon channel irons 1 is mounted the platform or bale table 2, secured to the channel irons 4 of the press proper, strong diagonal bars 3 being employed to brace said table to said irons. To the channel irons 4', forming the rear side of the press are attached upper horizontal angle bars 6, 7, and lower horizontal channel bars 8, said bars 5, 6, 7, 8, thus forming the frame of the receiver, to which frame are secured the sheet iron walls 9 of said receiver. At the top of the receiver is secured a platform 10, comprising a main feed table 11 extending between the rear end of the receiver and the stack, and supported by strong diagonal braces 13, and, at the sides of the receiver, side gangways 12 (Figs. 3, 5,) upon which gangways the feed operators can walk up to the press proper, when necessary.

*Transportation.*—With our improved press the body of the machine is at all times in position over the wheels, there being no separate wagon for transporting the press. In practice it is necessary to rest the machine upon the ground while in use, and therefore in order to transport it over the field or on the road it is necessary to raise the body of the machine on the wheels from its position of rest, to clear the ground. For moving on the field the body of the machine needs to be raised only a few inches. The following are the means for so raising the body on the wheels in order to move it from place to place. The bolster 16, pivotally supported upon the front axle 14, by means of the fifth wheels 15, has in its ends square guides 17, preferably of steel. At the sides of the front platform 2 are secured depending guide bars 18 which can move vertically in said guides 17. Extending from the front of the bolster 16 is a bracket 19 adapted to support a lifting jack placed under the cross bar 20 supporting the front end of the platform 2. Thus, by means of such a jack, the front end of the body of the machine can be raised to any desired height within the limits of the jack. 21 indicates supporting blocks which can be placed between the bolster and the bars 18 to relieve the pressure from the jack, when said front end has been so raised.

From the lower channel bars 8 of the frame of the receiver depend vertical guides 22 which pass on each side of the rear axle 23 to prevent any horizontal relative motion of the latter, while permitting of vertical movement. These guides 22 stand upon the ground, when the press is in position. From the sides of the receiver body extend brackets 25, so that by placing jacks upon the rear axle and underneath said brackets, the rear end of the wagon body can also be raised to any desired height within the limit of the jacks. Blocks 26 are secured in suitable position to be interposed between the rear axle and the brackets 25 to take the strain off the jacks.

*Turning.*—To the front side of the press are secured two vertical guide bars 30, each of which can slide within a sleeve 31 secured at the rear end of a curved link 32, said links converging to the front of the machine, and being there connected to the upper ring 34 of the fifth wheel. The links 32 are curved upward to such an extent that the front wheels can freely pass under them to permit of the turning of said front wheels. It is to permit of raising or lowering the body on the wheels, that the sleeves 31 are vertically movable upon the guide bars. By means of this arrangement the machine can be wheeled close up to the side of the stack, and then turned through a right angle upon the rear wheels as a pivot, so that the rear end of the platform is close to the stack and in the proper position for feeding the hay.

*Feeding.*—The hay is drawn from the stack on to the feed table by means of a rake 36 secured to a rope 37 extending over a pulley 38 carried by the top bar 39 of a derrick 40. The sides of said derrick are pivoted upon a transverse shaft 41, so that the derrick can be adjusted at any desired angle of inclination by means of ropes 42 secured to the top of the derrick and wound around drums 43. Also, by this arrangement the derrick can readily be lowered to pass within doorways or under bridges or the like. Each side of the derrick carries at the bottom a pulley 44, and the rope attached to the rake passes over the pulley 38 at the top then around a pulley 35 on the side of the derrick and then around one of the pulleys 44, and can thus be drawn by a horse at the side of the machine, so that the hay is raked from the stack into the receiver, or on to the feed table, from which it can be pitched into the receiver.

Figure 1:
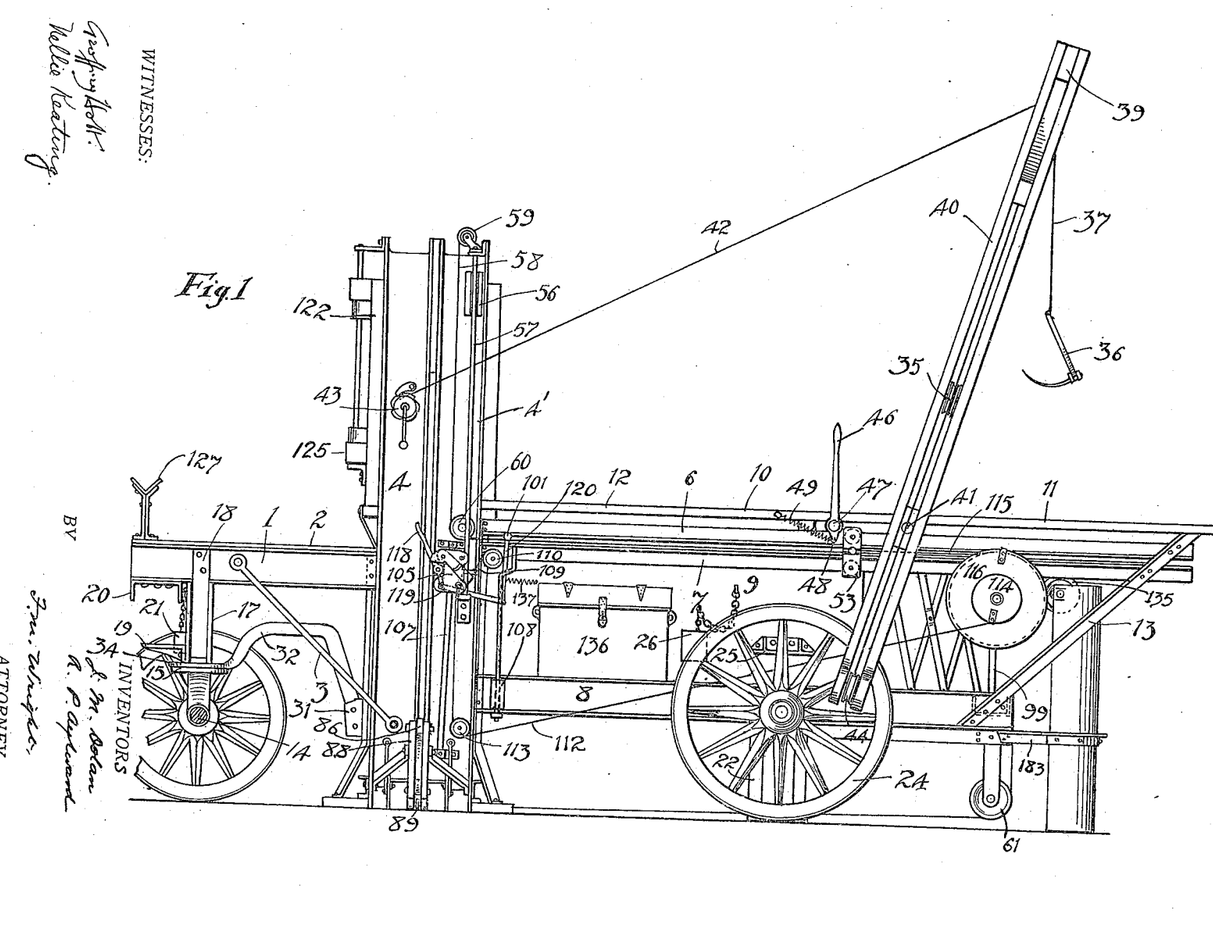
Figure 1 is a side view of the press proper.

*Trimmer.*—When a sufficient quantity of hay has been supplied to the receiver, an operator actuates a handle 46, which is attached to a transverse shaft 47 having arms 48 retracted by springs 49. Secured to said shaft 47 are arms 50, which engage lugs 51 secured upon the top of a trimmer 52. This trimmer travels between the angle bars 6, 7, and serves as a top or closure to the receiver, being provided with rollers 53 (Fig. 1) which run against said angle bars and also with horizontal rollers 55 which bear against the sides of said angle bars, and prevent binding of the trimmer in its movement. The trimmer is retracted during the compression of the hay, in the manner hereinafter described. Said trimmer serves, in its closure, not only to form a top for the receiver, but also to cut or trim off any surplus hay which has been fed into the receiver. When the operator actuates the handle 46 and thus raises the arms 50 out of engagement with the lugs 51, the trimmer is closed by means of weights 56, which have grooves to guide them on vertical posts 57, and are attached to cords 58, which run around upper pulleys 59, and then around lower pulleys 60. When released by the operation of the handle 46, the dropping of these weights closes the trimmer instantaneously, and the trimmer, in closing, forces the hay down into the receiver. The noise made by the dropping of the weights acts as a signal to the horses to start to compress the hay, or a signal bell may be used for this purpose.

*First compression.*—The horses are hitched to the end of a long sweep 62 and walk in a circle. Said sweep is attached to a vertical shaft 63 and from the sweep depends a lug 65 carrying a roller 132, which, as the sweep rotates, engage an arm 66 extending from a vertical rock shaft 67, to which is secured a segment 68. To said segment is secured a cable 69, which, after passing around the periphery of the segment 68, passes around and is attached to a small pulley 70 on a vertical shaft 71 to which is also secured a large pulley 72 around which passes a cable 73 which extends through a guide 74 under the bottom of the feed chamber 75 of the press and then around a sheave 61 at the rear end of the apparatus and is there attached to the rear arm 76 of lazy tongs 77, pivoted at 78, the front end of which tongs is attached to the back of a ram 79. Thus, as the sweep rotates, the ram is moved forward, forcing the hay from the receiver into the feed chamber, and effecting the first compression thereof. The ram has secured upon the rear side thereof brackets 80 which carry rollers 81 which roll respectively upon the bottom of angle bars 54 and against the underside of the trimmer, which rollers maintain the face of the ram vertical and prevent it binding in its movement.

Figure 2:
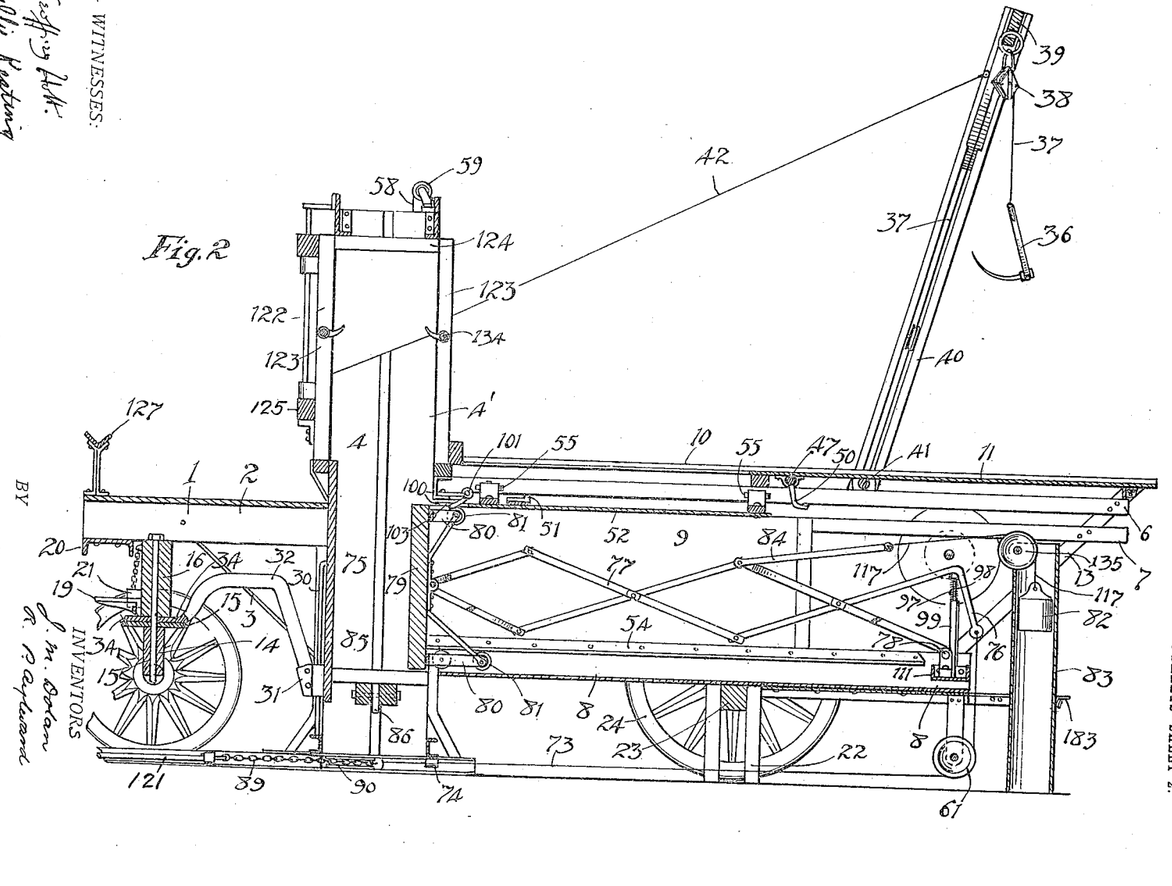
Fig. 2 is a longitudinal section of the same, showing certain parts in a different position.

It will be observed that as the lazy tongs are extended and the ram arrives near the end of its stroke, the rear extended arm 76 of said lazy tongs assumes a position in which it is inclined only slightly to the horizontal, and in this position the horizontal movement of the ram is very small as compared with the vertical downward movement of said arm, or, in other words, the ram moves very slowly at the end of its stroke, and the power derived from the horses is proportionately increased at the time when it is most required, namely, at the end of the first compression. Said lazy tongs are normally retracted by means of a weight 82 (Fig. 2) which is guided in its descent in a cylinder 83 carried by an arm 183 and is connected by a cord 117 passing around a pulley 135 to a loop 84 which is also attached to the lazy tongs, said weight thus retracting the tongs when the power derived from the horses is removed. This first compression is of considerable importance in the economical operation of the machine, for it destroys to a considerable extent the resilience of the hay, and reduces the work required for the second or main compression. The ram is moved forward into the feed chamber about 8 inches, and the top of the ram moves in close proximity to the under side of the trimmer. Consequently the whole of the hay in the receiver is forced into the feed chamber. In this respect the apparatus constitutes an important improvement over the old style of press, in which there was used a door hinged at the bottom, and in front of which door the hay was fed from the top. This door, in closing, caught or pinched the top of the charge of hay, so that, when the follower ascended, to compress the hay, this fringe or tail of hay, being retained by the door, created great friction between the side of the follower and the side of the press, and this friction continued for the entire upward movement of the follower, thus greatly increasing the amount of power required to operate the follower. Not only was this construction wasteful of power, but it was objectionable on account of the ragged fringe or tail in the bale so formed. This created considerable waste of the hay in transit, the bale would not stand evenly in certain positions, and it would not pack snugly and compactly in the car, or in storage. In the form of the bale produced by our improved press, there is practically no waste of the hay; the bales will pack together easily and snugly; each bale will stand equally well on any of its sides; and there is a great saving in the power required for effecting the compression. Since greater effective pressure is now obtained with the same actual horse power expended, the bale can be more compactly compressed and therefore occupy less room. The press is also more rapid in operation than with prior forms of presses. Thus whereas, in prior machines, it has been the practice to feed and compress from four to six times, to make a single bale of hay 225 lbs. in weight, with the present machine it is only necessary to feed and compress about three times to make a bale of about 250 lbs. in weight. This difference arises partly from the hay undergoing a powerful first compression before it is compressed by the follower, so that the power required to operate the latter is proportionately reduced, and also from the fact that a much larger receiver can be used than heretofore to receive the hay which undergoes its compression in the feed chamber.

Figure 7:
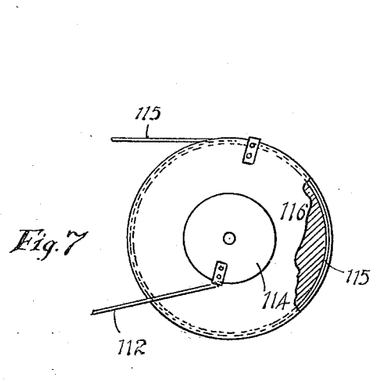
Fig. 7 is a detail side view of the speed-multiplying pulleys.
Figure 8:
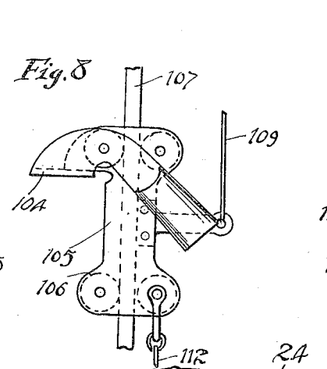
Fig. 8 is an enlarged detail side view of the traveler.

*Main compression.*—The main compression is effected by means of the follower 85, the operation of which is, in general, similar to that in the old style of press, that is to say, the cross bar 86 of the follower has pivoted to its ends the arms 87 of toggle levers 88 pivoted at their lower ends to the frame of the press, there being attached to the extended ends of said arms 87 chains 89 which pass around horizontal pulleys 90 and then into a channel 91. The rear end of this channel fits between guides 92 in the front of the press proper. Said chains 89 are connected with a single bar 121 which extends along the channel and is connected to a chain 93 which is connected to an eccentric ring 94 which is operated by the sweep in the manner common in this class of devices. Before, however, the follower 85 can begin to ascend, the ram 79 must be moved out of its way, for, as already stated, this ram has been moved about 8 inches into the interior of the feed chamber. It is, therefore, arranged that, before the follower ascends, the roller 132 depending from the sweep escapes past the end of the arm 66, thereby releasing the cable 69 by means of which the ram was forced into the feed chamber. As soon as it is released, the ram immediately moves back, due to the action of the weight 82, and since it is very important that this movement should be rapidly effected, so that the ram is out of the way before the follower begins to ascend, there is provided, in addition to the weight 82, a spring 97 surrounding a rod 98 sliding in a vertical tube 99, the head of which rod presses against the extended arm 76 of the lazy tongs. When the ram is operated to compress the hay, said arm depresses said head, but, as soon as the arm is released, in the manner above described, the spring acts instantaneously to raise said arm and withdraw the ram. However, the ram when thus released returns only a sufficient distance to enable the follower to ascend within the feed chamber, that is, it returns to a position parallel with the rear wall of the press. It cannot at this time return farther than said position, because it is caught at this point by latches 100 secured upon a transverse rock shaft 101 and received within recesses in the underside of the bar 102, which forms the upper edge of the opening for the ram, which latches, when the ram moves forward to compress the hay, drop behind the top of the ram, the front edge of the trimmer being formed with slots or recesses 103 to permit said latches to drop therethrough. By the continued movement of the sweep the follower now rises, forcing the hay upward. As it so rises it draws back the trimmer, this being effected by the central bar of the follower engaging a dog 104 pivoted upon a vertical traveler 105, (Fig. 8) at each side of the press, which traveler is provided with wheels 106 running on a vertical bar 107 and counterbalanced by a weight 108 connected to a cord 109 passing around a pulley 110 and connected with the traveler. The object of the counterbalance is to retain the traveler in any position to which it is moved unless positively shifted therefrom in the normal operation of the mechanism. A cord 112 is attached to the traveler and passes around a pulley 113 mounted on the press and then around a small pulley 114, (Fig. 7) which is secured to a large pulley 116, to which is connected a cord 115, said cord being also connected to the rear end of the trimmer. By this means the trimmer moves rearward as the follower ascends. The dog 104 is pivoted upon the traveler, instead of forming it as an arm rigidly extending therefrom, in order to prevent breakage in case of accidental dropping of the follower.

Figure 9:
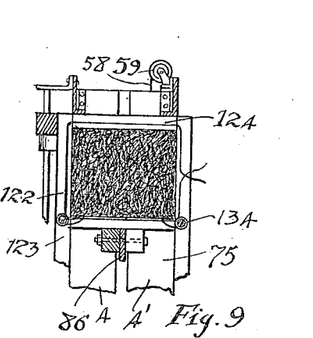
Fig. 9 is a sectional view of the baling chamber.
Figures 10, 11, 12:
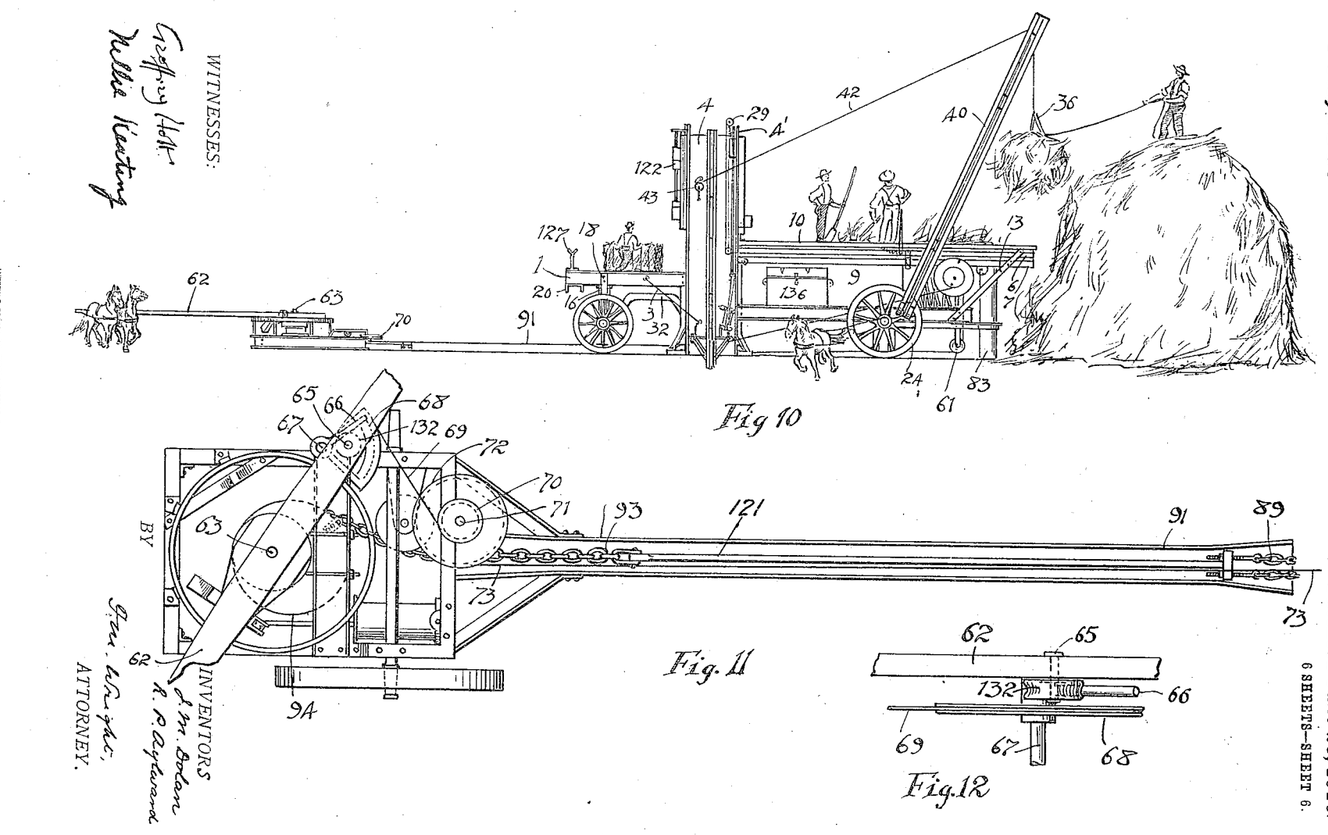
Fig. 10 is a side view of the entire apparatus.
Fig. 11 is a plan view of the power mechanism.
Fig. 12 is a detail broken side view of the same.

When the follower arrives at the bottom of the baling chamber, that is, to the level of the top of the receiver, an end of its central bar engages the upper end of a lever 118 which is connected by a link 119 to an arm 120 on the rock shaft 101 upon which are secured the latches 100 which hold the ram in position. Thereby said rock shaft 101 is rocked against the action of a spring 137 so that the latches are removed, and the ram can fully return to its original position, which it immediately does through the force of the weight 82. The follower then continues to ascend and compress the charge of hay. Each charge of hay, after being compressed, is retained in position in the press by means of spring-actuated dogs 134, (Fig. 9) which turn upward as the charge of hay passes them, but spring inward, into the press, in a horizontal position, and prevent the hay dropping down again.

*Wiring.*—After the above operation is repeated about three times, a sufficient quantity of hay has been compressed to form a bale. The bale is then wired. By the construction of our feed press this wiring operation is effected while the bale is in the press, and before the opening of the door through which the bale is removed from the press. For this purpose, both said door 122, and the back of the press, are formed with vertical slots 123 corresponding in number and position with those of the wires when the bale is tied. The top of the press and also the follower are formed with longitudinal slots 124 of corresponding positions. Also the cross bar 125 at the bottom of the opening for the door is placed lower than the level reached by the follower in its final position. With this construction, it is possible to wire and tie the bale before taking it out of the press and while it is still under compression. Any time after the first charge of hay has been carried up into the bale chamber by the follower, the operator on the baling table passes one end of each wire through the slots 123 in the door 122 and in the rear of the press, and above the hay. Then, when the final charge of hay has been compressed, said operator performs a like operation with the other end of each of said wires, passing these ends below the bale through the longitudinal slots in the follower to the rear side of the press. Then, before the bale door 122 is opened, the feed operators walk from the feeding table on the side gangways up to the press, and tie the ends of the wires together at the rear side of a bale. Thus the bale is tied when under great compression, thereby avoiding all bulging or unevenness of the bale, which results when the door is partly opened before the bale is tied. The door 122 is then opened in the front side of the press, the bale drops on to the bale table, and is then moved on to a scale on a scale table at the side of the bale table. After a stack has been finished, the body of the machine is then raised by means of the jacks, the scale table is swung up and hooked into position at the side of the press table, and the machine is then moved on its own wheels to another stack, and is quickly adjusted for operation thereon. The necessary tools are carried in a tool box 136, located at any suitable place on the machine.

It is to be understood that while the present machine has been designed especially for the purpose of baling hay, yet its use is not limited thereto, and that the word "hay" is used in the claims merely as typical of any substance which it may be desired to bale or compress by the machine.

We claim—

1. In a portable hay press, the combination, with the front wheels and axle, and the bolster therefor, of the body of the press, said bolster and body being provided with means for interposing a lifting jack therebetween, and means for guiding the body in its vertical movement relative to the bolster, substantially as described.

2. In a portable hay press, the combination, with rear wheels and an axle therefor, of the body of the press, said body and axle being provided with means for interposing lifting jacks therebetween, and means for guiding the rear end of the body in its vertical movement relative to said axle, substantially as described.

3. In a portable hay press, the combination, with the front wheels and axle and a bolster upon said axle, of the body of the press supported upon said bolster so as to be capable of being raised therefrom, vertical guide bars secured to said body, and links fixedly connected with the bolster and having their rear ends slidably connected with said guide bars, substantially as described.

4. In a portable hay press, the combination, with the front wheels and axle and a bolster upon said axle, of the body of the press supported upon said bolster so as to be capable of being raised therefrom, vertical guide bars secured to said body and links fixedly connected with the bolster and having their rear ends slidably connected with said guide bars, said links being curved upward to permit the front wheels to pass thereunder, substantially as described.

5. In a portable hay press, the combination, with the front wheels and axle, and the bolster upon the axle, of the press body, and a connection between said body and bolster permitting of vertical adjustment therebetween, but preventing horizontal movement of the body relative to the bolster, substantially as described.

6. In a hay press, the combination, with the front wheels and axle, and the bolster thereon of a press proper, a bale table secured to said press, the front end of said table being supported upon the bolster, and a connection between the bolster and the press proper independent of said table, permitting the press proper to be vertically adjusted relative to the bolster, but preventing any horizontal relative movement therebetween, substantially as described.

7. In a portable hay press, the combination of a press proper, having an opening through which the hay is charged into the press, a receiver adjacent to the said opening, means for charging the hay from the receiver into the press through said opening, and independent means for completely inclosing the hay in said receiver before so charging it into the press, substantially as described.

8. In a hay press, the combination of a press proper having an opening through which the hay is charged thereinto, a receiver adjacent to said opening and having an open side through which the hay is delivered to the receiver, means for closing said open side, and independent means for charging the hay from the receiver into the press, substantially as described.

9. In a hay press, the combination of a press proper, having an opening through which the hay can be charged into the press, a box-like receiver adjacent to said opening and having an open side through which the hay can be delivered to the receiver, a slidable trimmer adapted to close said open side, and means for charging into the press the hay inclosed within said receiver, substantially as described.

10. In a portable hay press, the combination of an upright press proper having an opening in its side through which the hay can be charged into the press, a box-like receiver adjacent to said side, a slidable trimmer adapted to close the top of said receiver to inclose the hay therein, a ram in said receiver adapted to press the hay therefrom into the press, means for normally closing said trimmer, a latch for preventing said closure, and means, under the control of the operator, for removing said latch to automatically close the trimmer, substantially as described.

11. In a portable hay press, the combination of an upright press proper having an opening in its side through which the hay can be charged into the press, a follower therein, a box-like receiver adjacent to said side, a slidable trimmer adapted to close the top of said receiver to inclose the hay therein, a ram in said receiver adapted to press the hay therefrom into the press, means actuated by the movement of the follower for withdrawing the trimmer to open the receiver, means for closing the trimmer when the follower is in its retracted position, and means under the control of the operator for releasing said closing means, substantially as described.

12. In a hay press, the combination of a press proper, having an opening in its side, a receiver for the hay connected with said press through said opening, a ram movable in said receiver, a sweep, a rope or cable moved by the movement of said sweep, means for actuating said ram, a rope or cable attached to said actuating means, and means for producing an increased speed of the latter cable from the movement of the former, substantially as described.

13. In a hay press, the combination of a press proper, having an opening in its side, a receiver for the hay, a ram movable in said receiver and adapted to charge the hay therefrom into the press, a cable for actuating said ram, and an operative connection between said cable and ram, arranged to produce, from a uniform movement of the cable, a rapid movement of the ram in the first part of its advance and a slow movement at the end thereof, substantially as described.

14. In a hay press, the combination of a press proper, having an opening in its side, a receiver for the hay, a ram movable in said receiver and adapted to charge the hay therefrom into the press, a cable for actuating said ram, and lazy tongs, one end of which is connected to said ram, and to an arm at the other end of which the cable is connected, substantially as described.

15. In a hay press, the combination of a press proper having an opening in its side, a follower in said press, a receiver adjacent to said press and arranged to charge the hay into said press through said opening, a ram moving longitudinally in said receiver, means for moving said ram, arranged to force said ram completely out of said receiver and into said press, means for retracting said ram, means automatically operating to restrict the return movement of the ram, when released from the power applied thereto, to a position substantially flush with said opening, and means automatically operated by the follower in the press, when it arrives at a predetermined position, for withdrawing said restricting means, substantially as described.

In testimony whereof we have hereunto set our hands in the presence of two subscribing witnesses.

JAMES M. DOLAN.
RICHARD P. AYLWARD.

Witnesses:
EDWARD F. AYLWARD,
J. D. RYAN.